United States Patent
Wu et al.

(10) Patent No.: US 10,107,471 B2
(45) Date of Patent: Oct. 23, 2018

(54) LIGHT FIXTURE INCLUDING AN ORIENTED CROSSLINKED SEMI-CRYSTALLINE POLYMER AND METHODS OF MAKING SAME

(71) Applicant: 3M INNOVATIVE PROPERTIES COMPANY, St. Paul, MN (US)

(72) Inventors: Tianyu Wu, St. Paul, MN (US); Joseph D. Rule, Woodbury, MN (US); Gina M. Albanese, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/515,375

(22) PCT Filed: Sep. 29, 2015

(86) PCT No.: PCT/US2015/052779
§ 371 (c)(1),
(2) Date: Mar. 29, 2017

(87) PCT Pub. No.: WO2016/053934
PCT Pub. Date: Apr. 7, 2016

(65) Prior Publication Data
US 2017/0219183 A1  Aug. 3, 2017

Related U.S. Application Data
(60) Provisional application No. 62/058,234, filed on Oct. 1, 2014.

(51) Int. Cl.
*B60Q 1/14* (2006.01)
*F21V 1/08* (2006.01)
(Continued)

(52) U.S. Cl.
CPC ............ *F21V 1/08* (2013.01); *B29C 61/06* (2013.01); *B29C 61/0616* (2013.01); *F21V 1/22* (2013.01);
(Continued)

(58) Field of Classification Search
USPC .............................. 362/278, 277, 284, 296.01
See application file for complete search history.

(56) References Cited

U.S. PATENT DOCUMENTS

| 7,906,573 | B2 | 3/2011 | Mather |
| 2005/0201116 | A1 | 9/2005 | Browne |

FOREIGN PATENT DOCUMENTS

| DE | 4424656 | 1/1996 |
| EP | 1 521 035 | 4/2005 |

(Continued)

OTHER PUBLICATIONS

Chung, "Two-Way Reversible Shape Memory in a Semicrystalline Network," Macromolecules, 2008, vol. 41, No. 1, pp. 184-192.
(Continued)

*Primary Examiner* — Vip Patel
(74) *Attorney, Agent, or Firm* — Adrian L. Pishko

(57) ABSTRACT

Light fixtures (100, 200, 400, 500, 600, 700) are provided, including a lighting element (10, 20, 40, 50, 60, 70), an oriented crosslinked semi-crystalline polymer (12, 22, 42, 52, 62, 72) disposed adjacent to or connected to the lighting element, and a control mechanism (14, 24, 44, 64, 74). The control mechanism is in electrical communication with the lighting element (10, 20, 40, 50, 60, 70) and controls an energy output of the lighting element and a temperature of the oriented crosslinked semi-crystalline polymer (12, 22, 42, 52, 62, 72). Typically, when the control mechanism changes the temperature of the oriented crosslinked semi-crystalline polymer, the shape of the polymer changes. A (Continued)

method of making a light fixture (100, 200, 400, 500, 600, 700) is also provided. The method includes providing a lighting element (10, 20, 40, 50, 60, 70), forming a crosslinked semi-crystalline polymer (12, 22, 42, 52, 62, 72), and disposing the crosslinked semi-crystalline polymer adjacent to the lighting element (10, 20, 40, 50, 60, 70) or connecting the crosslinked semi-crystalline polymer to the lighting element. The method further includes electrically connecting a control mechanism (14, 24, 44, 64, 74) with the lighting element.

17 Claims, 9 Drawing Sheets

(51) Int. Cl.
| | |
|---|---|
| *B29C 61/06* | (2006.01) |
| *F21V 3/04* | (2018.01) |
| *F21V 21/14* | (2006.01) |
| *F21V 21/32* | (2006.01) |
| *F21V 1/22* | (2006.01) |
| *F21V 23/04* | (2006.01) |
| *F21V 3/02* | (2006.01) |
| *F21W 121/00* | (2006.01) |
| *F21V 11/18* | (2006.01) |
| *B32B 5/24* | (2006.01) |
| *B32B 7/12* | (2006.01) |
| *B32B 15/04* | (2006.01) |
| *B32B 15/08* | (2006.01) |
| *B32B 25/04* | (2006.01) |
| *B32B 27/08* | (2006.01) |
| *B32B 27/12* | (2006.01) |
| *B32B 1/00* | (2006.01) |
| *B29L 31/00* | (2006.01) |

(52) U.S. Cl.
CPC .............. *F21V 3/04* (2013.01); *F21V 21/14* (2013.01); *F21V 21/32* (2013.01); *F21V 23/04* (2013.01); *B29L 2031/7472* (2013.01); *B32B 1/00* (2013.01); *B32B 5/245* (2013.01); *B32B 7/12* (2013.01); *B32B 15/046* (2013.01); *B32B 15/08* (2013.01); *B32B 25/045* (2013.01); *B32B 27/08* (2013.01); *B32B 27/12* (2013.01); *B32B 2266/0242* (2013.01); *B32B 2266/0278* (2013.01); *B32B 2307/514* (2013.01); *B32B 2307/54* (2013.01); *B32B 2307/546* (2013.01); *B32B 2307/704* (2013.01); *B32B 2307/738* (2013.01); *B32B 2457/00* (2013.01); *F21V 3/02* (2013.01); *F21V 11/18* (2013.01); *F21W 2121/00* (2013.01)

(56) References Cited

FOREIGN PATENT DOCUMENTS

| | | |
|---|---|---|
| GB | 1392212 | 4/1975 |
| JP | 08-077817 | 3/1996 |
| JP | 2010-135116 | 6/2010 |

OTHER PUBLICATIONS

Fehrenbacher, "Blooming Protea Lamp," Posted online on May 30, 2006, Retrieved from the internet on Mar. 27, 2014, URL <http://inhabitat.com/thermotropic-blooming-protea-lamp/>, pp. 16.

Gunes, "Effect of Thermal Expansion on Shape Memory Behavior of Polyurethane and Its Nanocomposite," Journal of Polymer Science Part B: Polymer Physics, vol. 46, No. 14, Jul. 2008, pp. 1437-1449.

Hong, "Two-way Shape Memory Behavior of Shape Memory Polyurethanes with a Bias Load," Smart Materials and Structures, Feb. 2010, vol. 19, No. 3, pp. 9.

Kang, "Two-way Actuation Behavior of Shape Memory Polymer/Elastomer Core/Shell Composites," Smart Materials and Structures, Feb. 2012, vol. 21, No. 3, pp. 7.

Tamagawa, "Thermo-Responsive Two-way Shape Changeable Polymeric Laminate," Material Letters, Mar. 2010, vol. 64, No. 6, pp. 749-751.

Varmo, "Lull—The Living Lamp," Idium Web Publishing, 2013, Retrieved from the internet on Mar. 26, 2014, URL <http://www.lull.no/>, pp. 3.

Volk, "COMP07-052 Characterization of the Non-Linear Rate Dependent Response of Shape Memory Polymers," Proceedings of COMP07, 6th International Symposium on Advanced Composites, May 2007, pp. 6.

International Search Report for PCT International Application No. PCT/US2015/052779, dated Dec. 22, 2015, 6 pages.

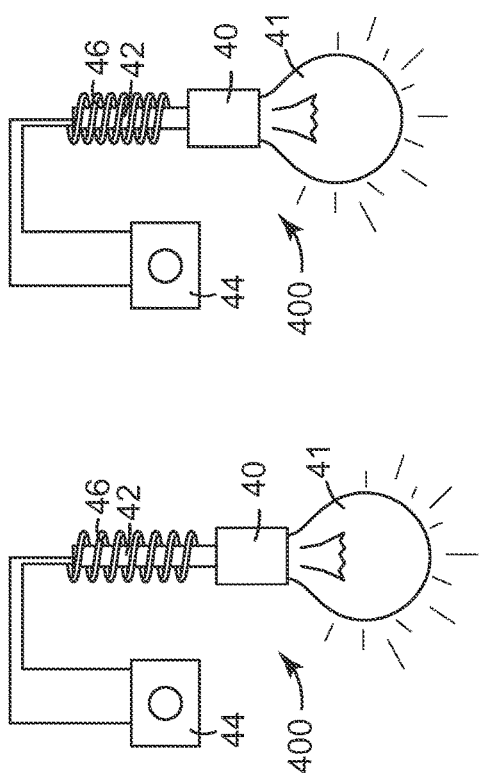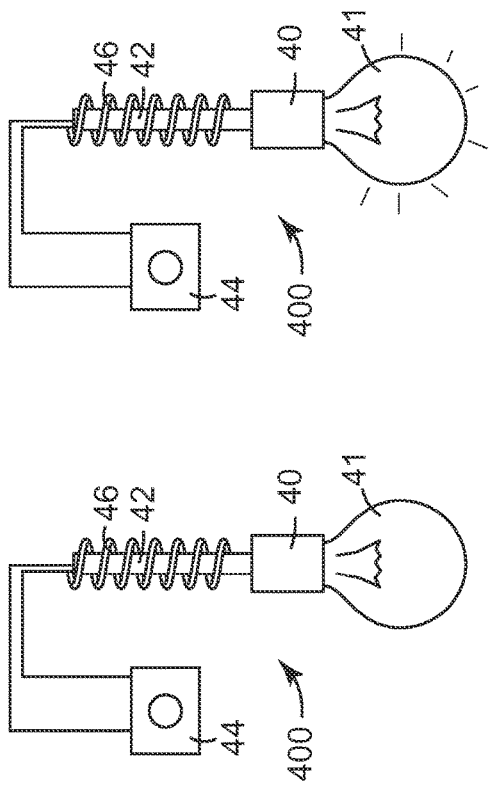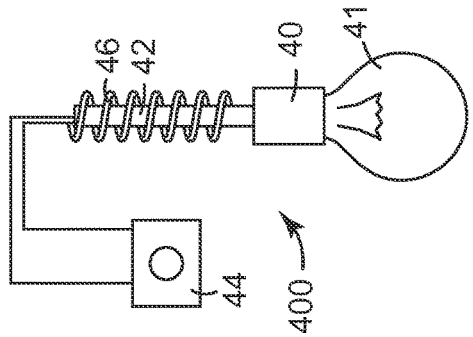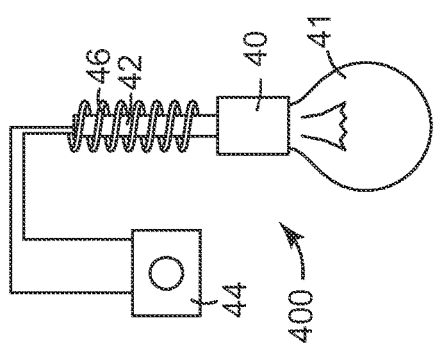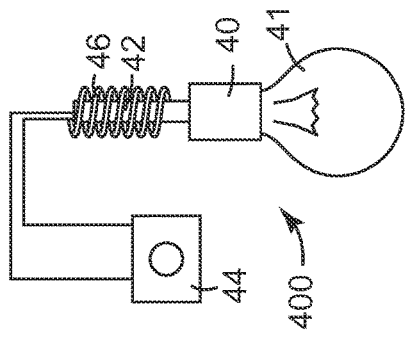

LIGHT FIXTURE INCLUDING AN ORIENTED CROSSLINKED SEMI-CRYSTALLINE POLYMER AND METHODS OF MAKING SAME

CROSS REFERENCE TO RELATED APPLICATIONS

This application is a national stage filing under 35 U.S.C. 371 of PCT/US2015/052779, filed Sep. 29, 2015, which claims the benefit of U.S. Application No. 62/058,234, filed Oct. 1, 2014, the disclosure of which is incorporated by reference in its/their entirety herein.

FIELD

Light fixtures that change their geometrical configuration are provided, and methods of making the light fixtures are provided.

BACKGROUND

The majority of commercially available light fixtures are stationary fixtures. If a user desires a different position or direction of energy output from such light fixtures, the user typically has to physically move or adjust the fixture itself, for instance adjusting the angle of a shade on the light fixture. A few recent innovations in this field utilize mechanical devices (e.g., motors) to enable configuration changes for the lighting fixtures, for instance a mechanical device employing separate controls for the light and motor.

Hence, there remains a need for light fixtures that change their configurations in response to an external stimulus.

SUMMARY

Light fixtures are provided including a crosslinked semi-crystalline polymer. In a first aspect, a light fixture is provided including a lighting element, an oriented crosslinked semi-crystalline polymer disposed adjacent to or connected to the lighting element, and a control mechanism. The control mechanism is in electrical communication with the lighting element and controls an energy output of the lighting element and a temperature of the oriented crosslinked semi-crystalline polymer.

In a second aspect, a method of making a light fixture is provided. The method includes providing a lighting element, forming a crosslinked semi-crystalline polymer, and disposing the crosslinked semi-crystalline polymer adjacent to the lighting element or connecting the crosslinked semi-crystalline polymer to the lighting element. The method further includes electrically connecting a control mechanism with the lighting element. The control mechanism controls an energy output of the lighting element and a temperature of the crosslinked semi-crystalline polymer.

The light fixtures advantageously change their configurations in response to an external stimulus.

BRIEF DESCRIPTION OF THE DRAWINGS

FIG. 4A is a side view schematic of an exemplary light fixture, in which the control mechanism is turned off.

FIG. 4B is a side view schematic of the light fixture of FIG. 4A, in which the control mechanism is turned on to a first intensity level.

FIG. 4C is a side view schematic of the light fixture of FIG. 4B, in which the control mechanism is turned on to a second intensity level higher than the first intensity level and the temperature of the oriented crosslinked semi-crystalline polymer has increased as compared to when the control mechanism was turned off.

FIG. 4D is a side view schematic of the light fixture of FIG. 4C, after the temperature of the oriented crosslinked semi-crystalline polymer has increased as compared to the light fixture of FIG. 4C.

FIG. 4E is a side view schematic of the light fixture of 4D, in which the control mechanism is turned off.

FIG. 4F is a side view schematic of the light fixture of 4E, in which the control mechanism is turned off and after the temperature of the oriented crosslinked semi-crystalline polymer has decreased as compared to the light fixture of FIG. 4E.

FIG. 4G is a side view schematic of the light fixture of 4F, after the temperature of the oriented crosslinked semi-crystalline polymer has decreased as compared to the light fixture of FIG. 4F.

FIG. 6B is a side view schematic of the light fixture of 6A after the control mechanism is turned on.

FIG. 7B is a side view schematic of the light fixture of 6A after the control mechanism is turned on.

Figure 1:
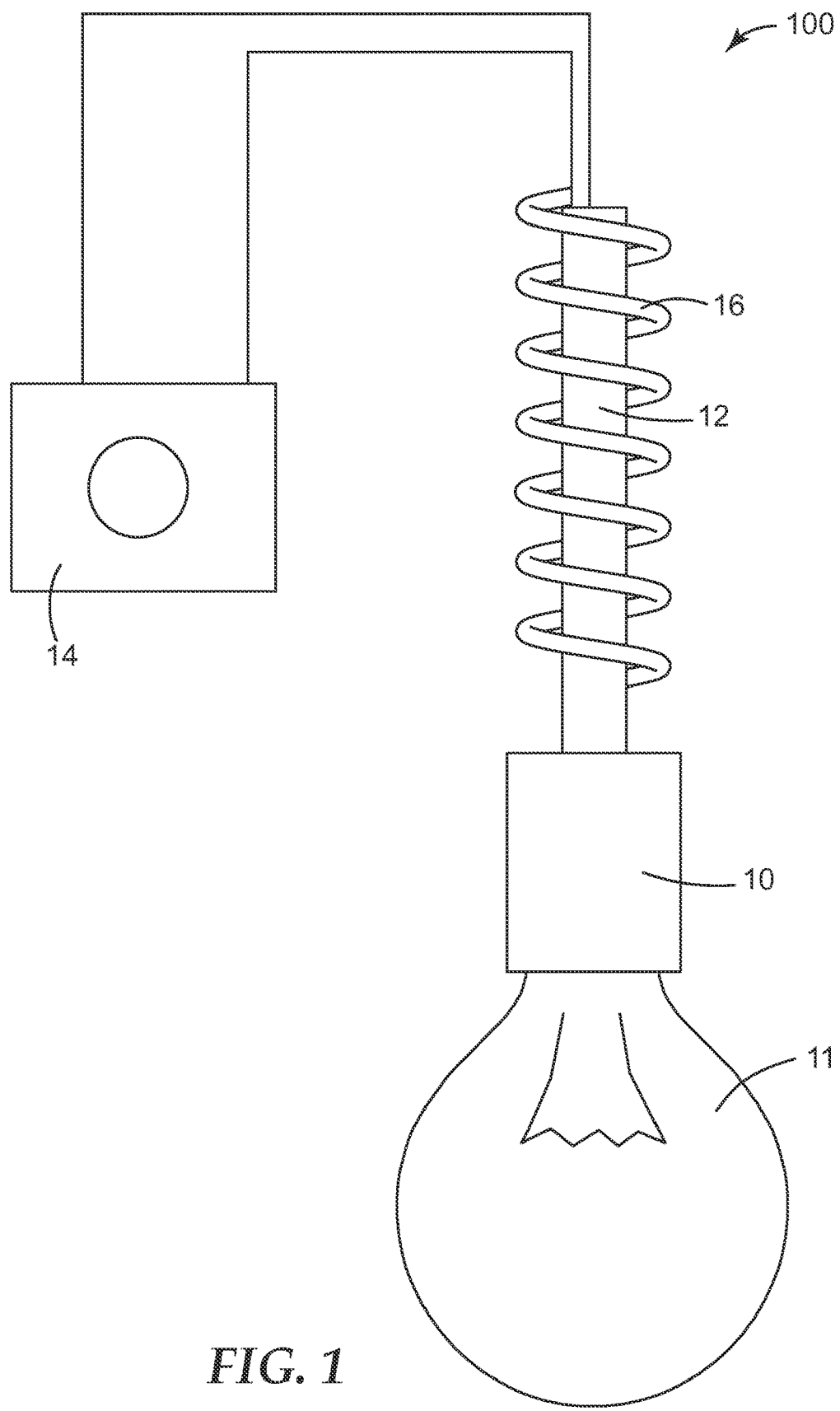
FIG. 1 is side view schematic of an exemplary light fixture.

While the above-identified drawings, which may not be drawn to scale, set forth various embodiments of the present disclosure, other embodiments are also contemplated, as noted in the Detailed Description.

DETAILED DESCRIPTION

Light fixtures and methods of making light fixtures including a crosslinked semi-crystalline polymer are provided.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "lighting element" refers to a part of a light fixture that outputs light. In many aspects, a lighting element includes a light socket into which a light bulb can be disposed.

The term "electrical communication" refers to connection via an electrical circuit.

The term "laminate" refers to a material including at least two layers disposed adjacent to each other along a major surface (e.g., stacked layers).

The term "resilient" refers to returning to an original form or position after being bent, compressed, or stretched.

The term "polymeric material" refers to a substance composed of at least one polymer.

The term "composite" refers to a material that contains both polymeric and non-polymeric components.

The term "foam" refers to an open cell or closed cell polymeric material.

In a first aspect, a light fixture is provided. More particularly, a light fixture is provided including a lighting element, an oriented crosslinked semi-crystalline polymer disposed adjacent to or connected to the lighting element, and a control mechanism. The control mechanism is in electrical communication with the lighting element and controls an energy output of the lighting element and a temperature of the oriented crosslinked semi-crystalline polymer.

Semi-crystalline polymers consist of a mixture of amorphous regions and crystalline regions. The crystalline regions are more ordered and segments of the chains pack in crystalline lattices. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semi-crystalline. Some polymers remain amorphous and show no tendency to crystallize. Some polymers can be made semi-crystalline by heat treatments, stretching or orienting and by solvent inducement, and these processes can control the degree of crystallinity.

The oriented crosslinked semi-crystalline polymer can include, for example and without limitation, polyethylene, polyethylene-co-vinyl acetate, radiation-crosslinked polycyclooctene, polyurethane, polyamide, and polylactide.

Polyethylene polymers contain long hydrocarbon chains, and include, for example, low density polyethylene (LDPE), medium density polyethylene (MDPE), high density polyethylene (HDPE), and ultra high molecular weight polyethylene (UHMWPE). Commercially available polyethylene polymers include LDPE, from Plastics International (Eden Prairie, Minn.)

Polyethylene-co-vinyl acetate polymers are copolymers of vinyl acetate and ethylene, such as those available from E.I. duPont de Nemours (Wilmington, Del.) under the ELVAX tradename.

Radiation-crosslinked polycyclooctene polymers are synthesized via ring-opening metathesis polymerization of cis-cyclooctene, followed by crosslinking through e-beam or gamma radiation. Commercially available polycyclooctene polymers include those having the trade designation VESTENAMER 8012, from Evonik Industries (Essen, Germany).

Polyurethane polymers are polymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. One suitable polyurethane is commercially available under the trade designation ESTANE 58309 from Lubrizol Advanced Materials, Inc. (Cleveland, Ohio).

Polyamide polymers are characterized by having an amide group, i.e., —C(O)NH—. Suitable polyamides include for example polycaprolactam or terpolymers produced from lactams (such as lauryl lactam), diamines, and diacids. Commercially available thermoplastic polyamides include those having the trade designation Elvamide 8061, from E.I. duPont de Nemours (Wilmington, Del.).

Polylactide polymers include those prepared by ring-opening polymerization of the lactic acid dimer, lactide. Lactic acid is optically active and the dimer appears in four different forms: L,L-lactide, D,D-lactide, D,L-lactide (meso lactide) and a racemic mixture of L,L- and D,D-. By polymerizing these lactides as pure compounds or as blends, polylactide polymers may be obtained having different stereochemistries and different physical properties, including crystallinity. The L,L- or D,D-lactide yields semicrystalline polylactide. Commercially available polylactides include those having the trade designation PLA 4032D, from NatureWorks LLC (Minnetonka, Minn.).

On the molecular level, the crosslinked semi-crystalline polymers represent polymer networks that include segment chains that are connected by netpoints. The netpoints can be formed by entanglements of the polymer chains or intermolecular interaction of certain polymer blocks. These netpoints are called physical crosslinks. Netpoints in the form of covalent bonds form chemical crosslinks.

A crosslinked semi-crystalline polymer can exhibit pronounced reversible shape changes with changing temperature across its melting point ($T_m$) under biasing load when the netpoints persist under those temperatures. Without being bound to theory, at temperatures above its $T_m$, a load applied to the crosslinked polymer causes it to deform, and the degree of deformation is determined by the polymer's elastic modulus. This deformation leads to molecular orientation in the direction of the biasing load. As the temperature drops below its $T_m$, the crystallizable segments crystallize along the orientation of the biasing force resulting in additional deformation. As the temperature subsequently increases above its $T_m$, the cross-linked polymer exhibits rubber elasticity and contracts back to its general degree of deformation present before crystallization. The magnitude of the reversible shape changes of the crosslinked semi-crystalline polymers depend on their cross-link density, the magnitude of the biasing force, the rate of the temperature changes, as well as the temperature range under which the reversible shape changes occur.

Notably, this process can be repeated under a constant biasing load with many cycles autonomously. In contrast, in a one-way shape memory cycle, the load that causes deformation is applied and then removed to generate a temporary shape. This process herein advantageously does not require that external modification of the load. While the crosslinked semi-crystalline polymers used here would be expected to display one way shape memory behavior, many other polymers, in particular amorphous, non-crystalline, or glassy polymers may display one-way shape memory behavior without displaying the two-way behavior required for the responsive lighting fixtures.

Referring to FIG. 1, an exemplary side view schematic is provided of a light fixture. The light fixture 100 comprises a lighting element 10, an oriented crosslinked semi-crystalline polymer 12 connected to the lighting element 10, and a control mechanism 14. The control mechanism 14 is in electrical communication with the lighting element 10 and controls an energy output of the lighting element 10 and a temperature of the oriented crosslinked semi-crystalline polymer 12. In the embodiment of FIG. 1, the lighting element 10 comprises a light socket with a light bulb 11 disposed within (e.g., in electrical communication with) the light socket. The lighting element 10 is attached to the oriented crosslinked semi-crystalline polymer 12 and a weight of the lighting element 10 is supported by the oriented crosslinked semi-crystalline polymer 12. In such embodiments, the oriented crosslinked semi-crystalline polymer 12 affects a position of the lighting element 10 with a change in the temperature of the oriented crosslinked semi-crystalline polymer 12. This is because a change in the temperature of the oriented crosslinked semi-crystalline polymer results in a change of shape of the oriented crosslinked semi-crystalline polymer, and the change of shape of the polymer will change the location of a lighting element attached to the oriented crosslinked semi-crystalline polymer.

The light fixture 100 further comprises a heating element 16 in electrical communication with the control mechanism 14. The control mechanism 14 controls a temperature of the oriented crosslinked semi-crystalline polymer 12 by controlling an amount of heat applied to the oriented crosslinked semi-crystalline polymer 12 from the energy output of the lighting element 10 and/or from the heating element 16. In the configuration illustrated in FIG. 1, it will be appreciated that the energy output of the lighting element 10 is generally directed away from the oriented crosslinked semi-crystalline polymer 12, thus it can be particularly useful to employ the heating element 16 to change the temperature of the oriented crosslinked semi-crystalline polymer 12. The heating element 16 may be provided in various configurations, such as a strip wound around the exterior of the oriented crosslinked semi-crystalline polymer 12 along at least a portion of its length as shown in FIG. 1, or a piece in contact with a single- or multi-part heating chamber (not shown). A multi-part heating chamber may be configured to telescope to adjust to the changing length of the crosslinked semi-crystalline polymer. Another configuration of the oriented crosslinked semi-crystalline polymer is a length of the polymer threaded through a plurality of pulleys and located in a heating chamber, which will allow for a greater length of the oriented crosslinked semi-crystalline polymer to fit into the heating chamber than if no pulleys were employed and concomitantly a greater extent of shape change with the temperature change in the heating chamber.

Different light bulbs provide different levels of energy outputs (e.g., compact fluorescent light bulbs typically give off less radiant heat than do incandescent light bulbs). The term "energy output" with respect to a lighting element encompasses wavelengths emitted by the lighting element, such as visible light wavelengths, infrared wavelengths, and ultraviolet wavelengths. The ability to supplement the energy output of the lighting element with a heating element to achieve a desired temperature change of the oriented crosslinked semi-crystalline polymer is advantageous, regardless of the configuration of a particular light fixture.

Figure 2:
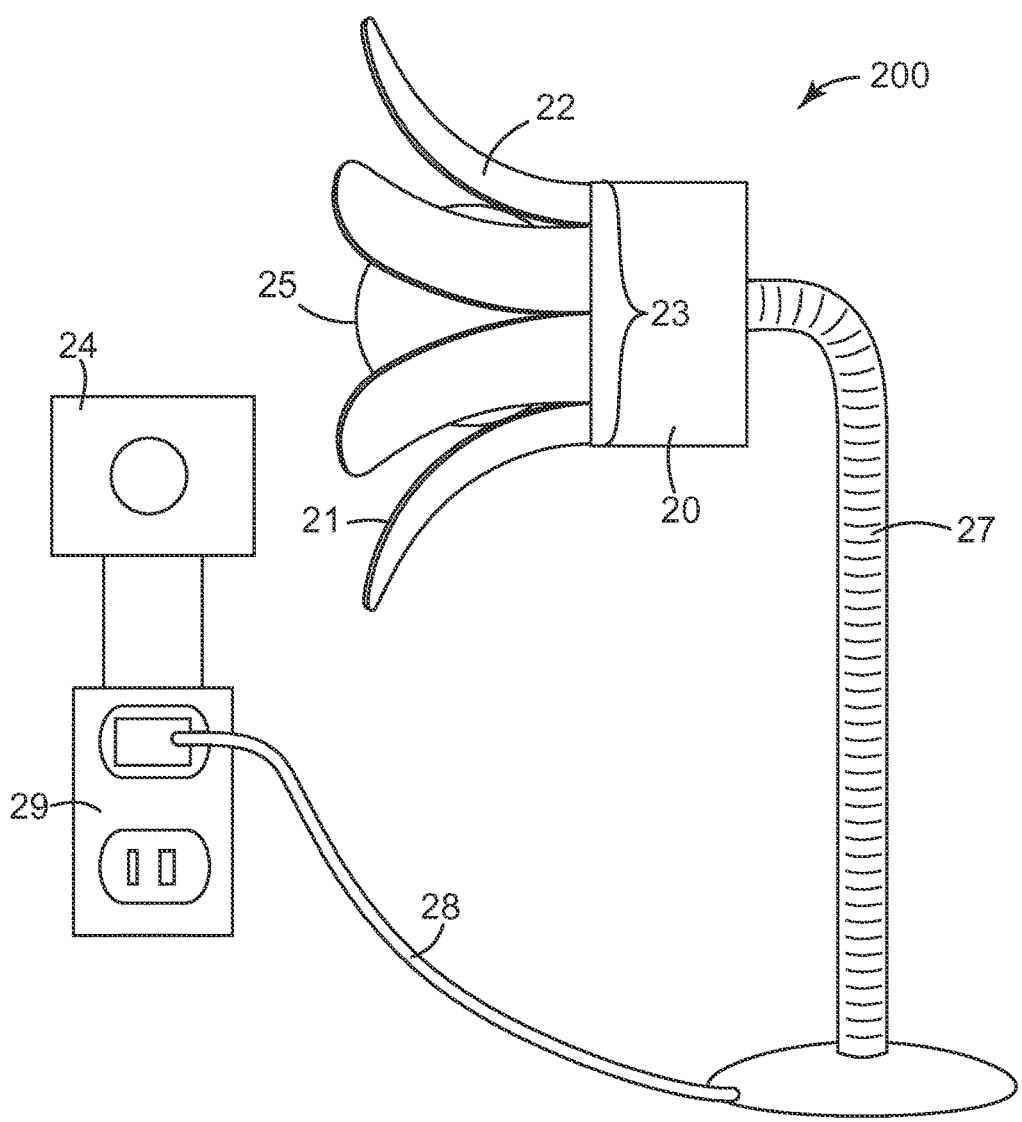
FIG. 2 is a side view schematic of another exemplary light fixture.

Referring to FIG. 2, an exemplary side view schematic is provided of another light fixture. The light fixture 200 comprises a lighting element 20, an oriented crosslinked semi-crystalline polymer 22 connected to the lighting element 20, and a control mechanism 24. The control mechanism 24 is in electrical communication with the lighting element 20 and controls an energy output of the lighting element 20 and a temperature of the oriented crosslinked semi-crystalline polymer 22. The lighting element 20 of this embodiment comprises a light socket (not shown). The light socket is at least partially surrounded by a shade 23, and a light bulb 25 is disposed within the light socket. In the embodiment illustrated in FIG. 2, the light fixture 200 further comprises a flexible stand 27 and a power cord 28. The power cord 28 is shown plugged into an electrical outlet 29, which is in electrical communication with the control mechanism 24. Hence, the control mechanism 24 is in removable electrical communication with the lighting element 20 via the power cord 28 and the electrical outlet 29.

Figure 3:
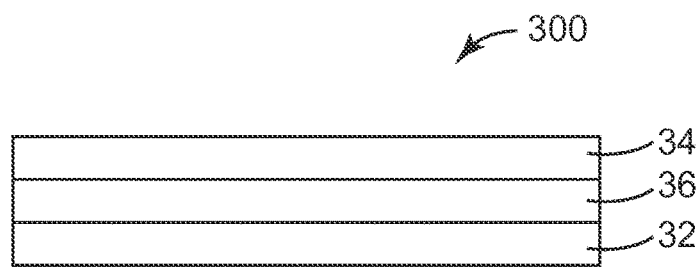
FIG. 3 is a cross-sectional schematic of an exemplary crosslinked semi-crystalline laminate.

Referring to FIG. 3, the oriented crosslinked semi-crystalline polymer 32 is laminated to a resilient material 34 to form a crosslinked semi-crystalline laminate 300. As noted above, the term "resilient" refers to a material that returns to an original form or position after being bent, compressed, or stretched. More particularly, the resilient material comprises a coefficient of expansion of less than $50 \times 10^{-6}$ per degree Celsius, such as less than $40 \times 10^{-6}$ per degree Celsius, or less than $30 \times 10^{-6}$ per degree Celsius. Suitable resilient materials include for example and without limitation, a metal, a fiber-reinforced polymeric composite, a filled polymeric composite, or a glass. The resilient material advantageously provides a constant stress to the oriented crosslinked semi-crystalline polymer such that the laminate will function as a two-way shape memory polymer. The term "two-way shape memory polymer" refers to a polymer that changes shape when heated above an initial temperature, and then returns to its prior shape upon cooling to the initial temperature under a stress. For example, when the temperature of the oriented crosslinked semi-crystalline polymer changes from an initial temperature $T_1$ to a second, higher temperature $T_2$, the shape of the laminate will change from an initial shape $S_1$ to a second, different shape $S_2$. If the temperature of the oriented crosslinked semi-crystalline polymer is returned to the initial temperature $T_1$, the shape of the laminate will return to the initial shape $S_1$ under the stress of the resilient material. The laminate can cycle back and forth between initial and different shapes many times.

The crosslinked semi-crystalline laminate 300 preferably includes an adhesive 36 disposed between the oriented crosslinked semi-crystalline polymer and the resilient material. In certain embodiments, the adhesive comprises a foam adhesive. Acrylic foam tapes are commercially available under trade designations "VHB" and "ACRYLIC FOAM TAPE" from 3M Company, (St. Paul, Minn.). In a further embodiment, a polyurethane foam tape may be used. Polyurethane foam tapes are commercially available under the trade designations "2845 URETHANE FOAM TAPE" "THERMALBOND V2100" and "T-BOND II" from the Saint-Gobain Performance Plastics, (Grandville, N.Y). According to certain embodiments, the adhesive comprises an epoxy adhesive, a urethane adhesive, a polyether adhesive, an acrylate adhesive, a cyanoacrylate adhesive, or a combination thereof. Suitable epoxy, urethane, acrylate, and cyanoacrylate adhesives are commercially available under trade designation "3M SCOTCH-WELD" from 3M Company, (St. Paul, Minn.). A suitable polyether adhesive is commercially available under trade designation "CHEM LINK CLEAR" from CHEM LINK products, LLC, (Schoolcraft, Mich.). Due to large internal stress in the laminate, the adhesive is selected to adhere strongly both to the oriented crosslinked semi-crystalline polymer and to the resilient material, to minimize potential failure of the laminate structure. The adhesive optionally comprises a thickness of at least 0.3 millimeters, at least 0.4 millimeters, at least 0.5 millimeters, at least 0.6 millimeters, at least 0.8 millimeters, or even at least 1 millimeter. Typically, the larger the adhesive thickness, the more responsive the laminate will be.

The laminate can advantageously affect a direction of light emitted from the lighting element with a change in the temperature of the oriented crosslinked semi-crystalline polymer. As noted above, the oriented crosslinked semi-crystalline polymer optionally acts as a two-way shape memory polymer. Applied stress to achieve a two-way shape memory polymer effect is provided by the resilient material of the laminate. For instance, when the temperature of the oriented crosslinked semi-crystalline polymer is increased, the shape of the oriented crosslinked semi-crystalline polymer is changed and the resilient material laminated to the oriented crosslinked semi-crystalline polymer also changes shape. The stress of the altered shape of the crosslinked semicrystalline polymer causes physical strain in the laminate. When the temperature of the oriented crosslinked semi-crystalline polymer is subsequently decreased, the shape of the oriented crosslinked semi-crystalline polymer changes under the stress of the resilient material in the laminate.

The configuration of the oriented crosslinked semi-crystalline polymer is not particularly limited; for instance, the oriented crosslinked semi-crystalline polymer can include a plurality of segments, a pattern, a complex shape, or a combination thereof. In many embodiments, the oriented crosslinked semi-crystalline polymer comprises a plurality of segments cooperating together to form a shade at least partially surrounding the lighting element. For instance, referring back to FIG. 2, the shade 23 includes a plurality of segments 21 each having a petal shape. In an alternate aspect, a light fixture shade includes a complex shape in which portions of the shape change orientation when the temperature of the oriented crosslinked semi-crystalline polymer changes.

Figure 6A:
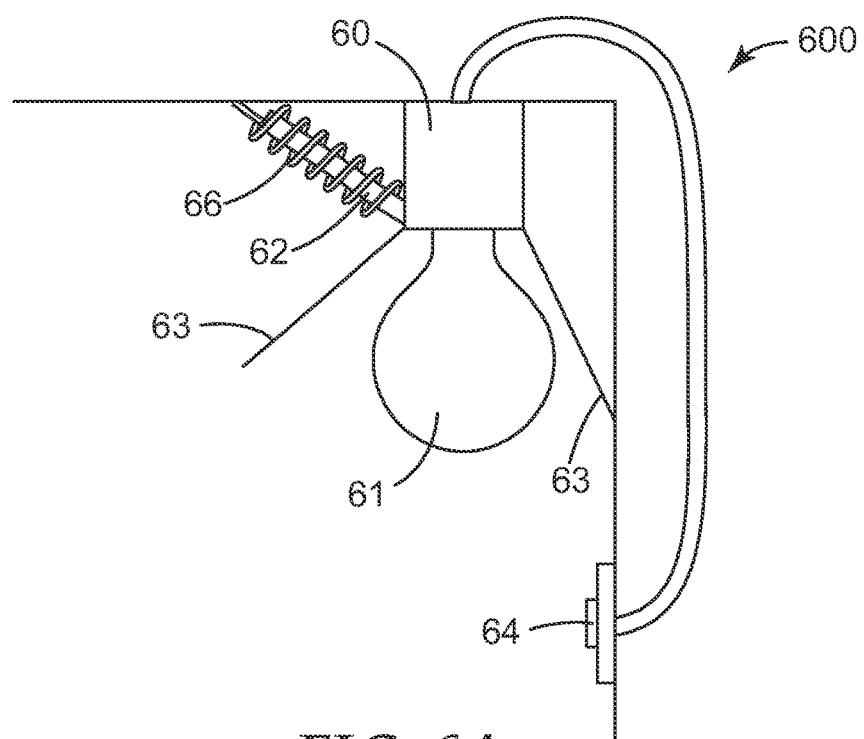
FIG. 6A is a side view schematic of an exemplary light fixture, in which the control mechanism is turned off.

Referring to FIG. 6A, a side view schematic is provided of a further exemplary light fixture. The light fixture 600 comprises a lighting element 60, an oriented crosslinked semi-crystalline polymer 62 connected to the lighting element 60, and a control mechanism 64. The control mechanism 64 is in electrical communication with the lighting element 60 and controls an energy output of the lighting element 60 and a temperature of the oriented crosslinked semi-crystalline polymer 62. In the embodiment of FIG. 6A, the lighting element 60 comprises a light socket with a light bulb 61 disposed within (e.g., in electrical communication with) the light socket. The lighting element 60 is attached to the oriented crosslinked semi-crystalline polymer 62 and a weight of the lighting element 60 is at least partially supported by the oriented crosslinked semi-crystalline polymer 62. The light fixture 600 further comprises a shade 63 and a heating element 66 in electrical communication with the control mechanism 64 and coiled around the oriented crosslinked semi-crystalline polymer 62. The control mechanism 64 controls a temperature of the oriented crosslinked semi-crystalline polymer 62 by controlling an amount of heat applied to the oriented crosslinked semi-crystalline polymer 62 from the energy output of the lighting element 60 and/or from the heating element 16.

Figure 6B:
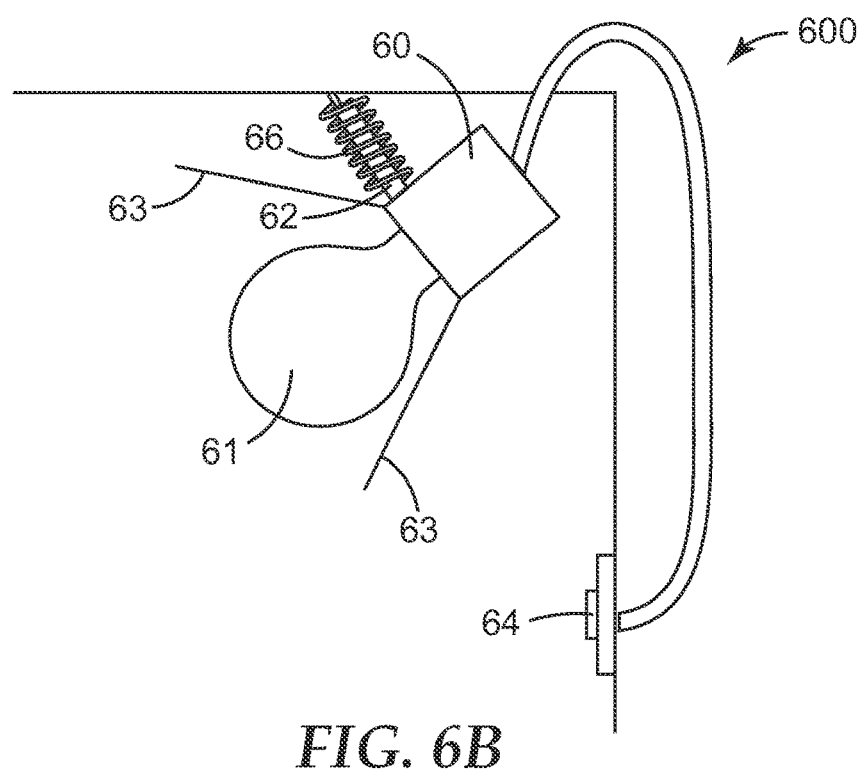

Referring now to FIG. 6B, a position of the light fixture 600 has been affected by the change of length of the oriented crosslinked semi-crystalline polymer 62 due to a change in the temperature of the oriented crosslinked semi-crystalline polymer 62. In particular, decreasing the length of the oriented crosslinked semi-crystalline polymer 62 changes the angle of the light fixture 600, including the light bulb 61 and the shade 63, and thus the direction of light output from the light fixture 600.

Figure 7A:
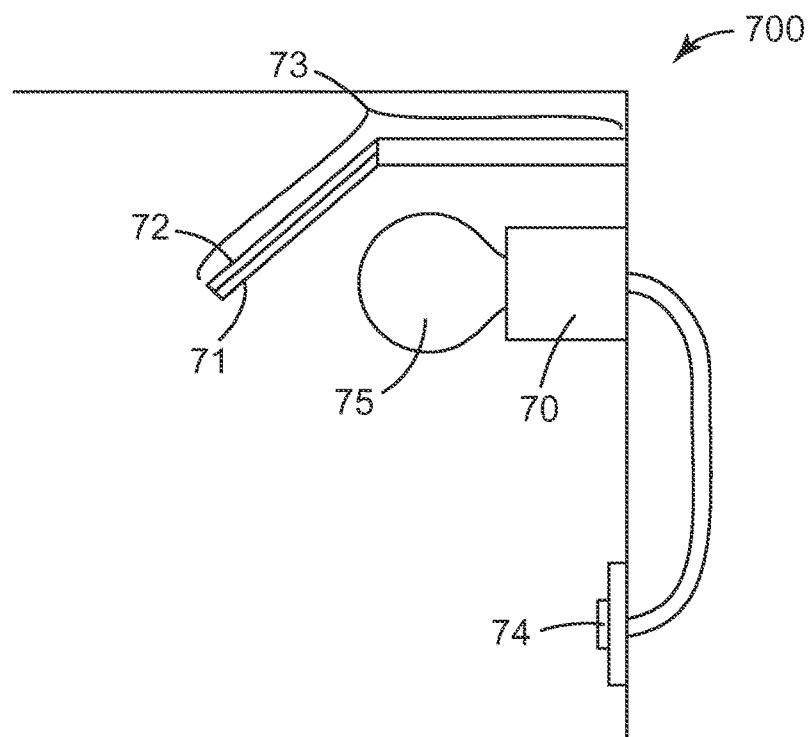
FIG. 7A is a side view schematic of an exemplary light fixture, in which the control mechanism is turned off.

Referring to FIG. 7A, a side view schematic is provided of another exemplary light fixture. The light fixture 700 comprises a lighting element 70, an oriented crosslinked semi-crystalline polymer 72 connected to the lighting element 70, and a control mechanism 74. The control mechanism 74 is in electrical communication with the lighting element 70 and controls an energy output of the lighting element 70 and a temperature of the oriented crosslinked semi-crystalline polymer 72. In the embodiment of FIG. 7A, the lighting element 70 comprises a light socket with a light bulb 75 disposed within the light socket. The lighting element 70 is disposed adjacent to the oriented crosslinked semi-crystalline polymer 72, which at least partially directs light output from the light bulb 75 and is thus referred to as a shade 73. The oriented crosslinked semi-crystalline polymer 72 is laminated to a resilient material 71 to form a crosslinked semi-crystalline laminate. The control mechanism 74 controls a temperature of the oriented crosslinked semi-crystalline polymer 72 by controlling an amount of heat applied to the oriented crosslinked semi-crystalline polymer 72 from the energy output of the lighting element 70.

Figure 7B:
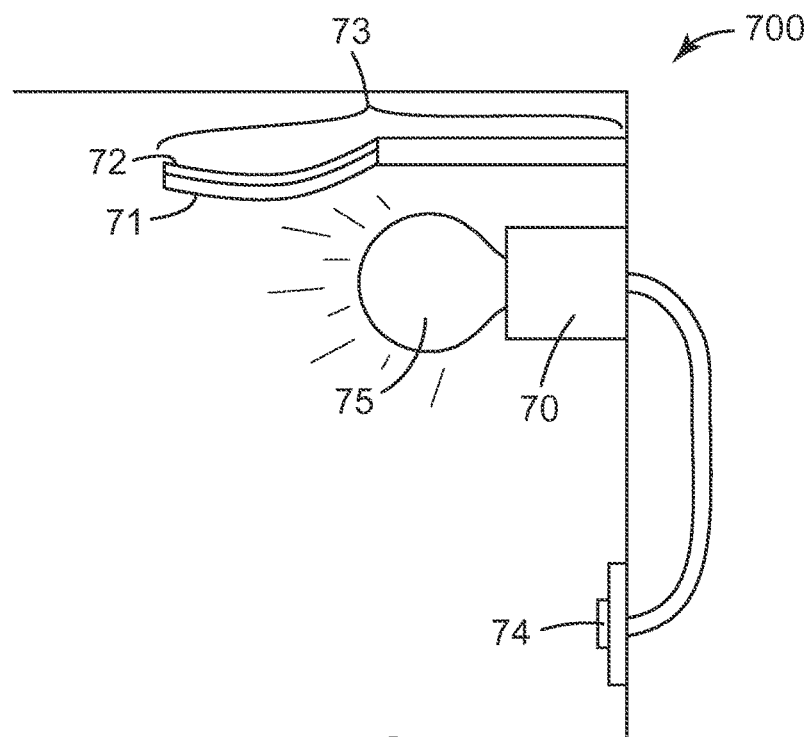

Referring now to FIG. 7B, a direction of light output from the light fixture 700 has been affected by the change of length of the oriented crosslinked semi-crystalline polymer 72 due to a change in the temperature of the oriented crosslinked semi-crystalline polymer 72. In particular, decreasing the length of the oriented crosslinked semi-crystalline polymer 72 causes the laminate portion of the shade 73 to curve away from the light bulb 75.

Advantageously, a single control mechanism controls both the energy output of the lighting element (e.g., brightness of light) and an amount of heat applied to the oriented crosslinked semi-crystalline polymer. In certain embodiments, the control mechanism comprises a single circuit. The use of a single circuit allows a user to simply plug the light fixture into a typical electrical outlet, or to wire the light fixture to a building's existing wiring without requiring specialized circuitry. Preferably, the control mechanism provides a variable or pulsed voltage to the lighting element, for instance by the control mechanism comprising a dimmer switch. A control mechanism that has just "on" and "off" states can be suitable; however, a control mechanism that can set a range of energies, such as a dimmer switch, provides finer control of the energy output and of the temperature of the oriented crosslinked semi-crystalline polymer. The temperature of the oriented crosslinked semi-crystalline polymer affects the shape of the oriented crosslinked semi-crystalline polymer, hence when the control mechanism changes the temperature of the oriented crosslinked semi-crystalline polymer, a shape of the oriented crosslinked semi-crystalline polymer changes.

The dimensions of the oriented crosslinked semi-crystalline polymer are not particularly limited. In an embodiment, the oriented crosslinked semi-crystalline polymer comprises an aspect ratio of length to width of at least 4, or at least 5, or at least 6, or at least 8, or at least 10, or even at least 15. For example, the light fixture is optionally a pendant light fixture comprising the lighting element suspended from the oriented crosslinked semi-crystalline polymer. Such an embodiment will typically include an oriented crosslinked semi-crystalline polymer having a high aspect ratio. The skilled practitioner can determine suitable dimensions for the oriented crosslinked semi-crystalline polymer such that the mass of the lighting element will provide the correct amount of stress to achieve a two-way shape memory polymer effect, using the following equation:

$$\varepsilon_1 < \frac{G}{A \cdot E} < \varepsilon_2$$

where G is the gravitational force on the pendant lighting fixture, A is the cross-sectional area of the crosslinked semicrystalline polymer, and E is the modulus of the semi-crystalline polymer derived from its stress-strain curve at $T_m+20°$ C., where $T_m$ is the melting point of the semi-crystalline polymer. Desired strain limits for the device are represented by $\varepsilon_1$ and $\varepsilon_2$, and $10\% < \varepsilon_1 < \varepsilon_2 < 1000\%$. In certain embodiments, $10\% < \varepsilon_1 < \varepsilon_2 < 1000\%$, or $100\% < \varepsilon_1 < \varepsilon_2 < 300\%$, or $50\% < \varepsilon_1 < \varepsilon_2 < 200\%$.

In a second aspect a method is provided. More specifically, the method includes providing a lighting element, forming a crosslinked semi-crystalline polymer, and disposing the crosslinked semi-crystalline polymer adjacent to the lighting element or connecting the crosslinked semi-crystalline polymer to the lighting element. The method further includes electrically connecting a control mechanism with the lighting element. The control mechanism controls an energy output of the lighting element and a temperature of the crosslinked semi-crystalline polymer.

In many embodiments, the forming of a crosslinked semi-crystalline polymer further includes orienting the crosslinked semi-crystalline polymer to a length at least 25% greater than the length of the crosslinked semi-crystalline polymer prior to the orienting, or at least 50% greater, or at least 75% greater, or at least 100% greater, or at least 125% greater, or even at least 150% greater than the length of the crosslinked semi-crystalline polymer prior to the orienting. The greater the extent of orientation, the larger the change in shape during use. The oriented crosslinked semi-crystalline polymer will recover at least 50% of its orientation length upon subjection to heat, or at least 60%, or at least 75%, or even at least 85% of its orientation length upon subjection to heat.

In certain embodiments, forming an oriented crosslinked semi-crystalline polymer further comprises laminating the oriented crosslinked semi-crystalline polymer to a resilient material to form a crosslinked semi-crystalline laminate. The resilient material comprises a coefficient of expansion of less than $50 \times 10^{-6}$ per degree Celsius, as discussed above.

Moreover, forming an oriented crosslinked semi-crystalline polymer optionally includes radiation crosslinking the crosslinked semi-crystalline polymer prior to the orienting, such as using electron beam radiation. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 100 to 300 kilo-electron volts (keV), pass out of the vacuum chamber through the foil window and penetrate whatever material is positioned immediately beyond the foil window. The quantity of electrons generated is directly related to the extractor grid voltage. As extractor grid voltage is increased, the quantities of electrons drawn from the tungsten wire filaments increase. Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

The article made by the method is as described in detail above with respect to the first aspect.

Various items are described that are light fixtures or methods of making light fixtures.

Embodiment 1 is a light fixture including a lighting element, an oriented crosslinked semi-crystalline polymer disposed adjacent to or connected to the lighting element, and a control mechanism. The control mechanism is in electrical communication with the lighting element and controls an energy output of the lighting element and a temperature of the oriented crosslinked semi-crystalline polymer.

Embodiment 2 is the light fixture of embodiment 1, further including a heating element in electrical communication with the control mechanism.

Embodiment 3 is the light fixture of embodiment 1 or embodiment 2, wherein the control mechanism controls a temperature of the oriented crosslinked semi-crystalline polymer by controlling an amount of heat applied to the oriented crosslinked semi-crystalline polymer from the energy output of the lighting element, from the heating element, or a combination thereof.

Embodiment 4 is the light fixture of embodiment 3, wherein the control mechanism controls a temperature of the oriented crosslinked semi-crystalline polymer by controlling an amount of heat applied to the oriented crosslinked semi-crystalline polymer from the heating element.

Embodiment 5 is the light fixture of embodiment 3, wherein the control mechanism controls a temperature of the oriented crosslinked semi-crystalline polymer by controlling an amount of heat applied to the oriented crosslinked semi-crystalline polymer from an energy output of the lighting element.

Embodiment 6 is the light fixture of any of embodiments 1 to 4, wherein the lighting element is attached to the oriented crosslinked semi-crystalline polymer and a weight of the lighting element is supported by the oriented crosslinked semi-crystalline polymer.

Embodiment 7 is the light fixture of any of embodiments 1 to 6, wherein the oriented crosslinked semi-crystalline polymer comprises an aspect ratio of length to width of at least 4.

Embodiment 8 is the light fixture of any of embodiments 1 to 4, 6, or 7, wherein the light fixture is a pendant light fixture comprising the lighting element suspended from the oriented crosslinked semi-crystalline polymer.

Embodiment 9 is the light fixture of any of embodiments 1 to 3, 5, or 7, wherein the oriented crosslinked semi-crystalline polymer is laminated to a resilient material to form a crosslinked semi-crystalline laminate, wherein the resilient material comprises a coefficient of expansion of less than $50 \times 10^{-6}$ per degree Celsius.

Embodiment 10 is the light fixture of embodiment 9, wherein the crosslinked semi-crystalline laminate forms a shade at least partially surrounding the lighting element.

Embodiment 11 is the light fixture of any of embodiments 1 to 8, wherein the oriented crosslinked semi-crystalline polymer affects a position of the lighting element with a change in the temperature of the oriented crosslinked semi-crystalline polymer.

Embodiment 12 is the light fixture of embodiment 9 or embodiment 10, wherein the laminate affects a direction of light emitted from the lighting element with a change in the temperature of the oriented crosslinked semi-crystalline polymer.

Embodiment 13 is the light fixture of any of embodiments 9 to 12, wherein the resilient material is a metal, a fiber-reinforced polymeric composite, a filled polymeric composite, or a glass.

Embodiment 14 is the light fixture of any of embodiments 9 to 13, wherein the crosslinked semi-crystalline laminate comprises an adhesive disposed between the oriented crosslinked semi-crystalline polymer and the resilient material.

Embodiment 15 is the light fixture of embodiment 14, wherein the adhesive comprises a foam adhesive.

Embodiment 16 is the light fixture of embodiment 14 or embodiment 15, wherein the adhesive comprises a thickness of at least 0.4 millimeters.

Embodiment 17 is the light fixture of any of embodiments 9 to 16, wherein the oriented crosslinked semi-crystalline polymer comprises a plurality of segments, a pattern, a complex shape, or a combination thereof.

Embodiment 18 is the light fixture of embodiment 17, wherein the oriented crosslinked semi-crystalline polymer comprises a plurality of segments cooperating together to form a shade at least partially surrounding the lighting element.

Embodiment 19 is the light fixture of embodiment 18, wherein each segment of the oriented crosslinked semi-crystalline polymer comprises a petal shape.

Embodiment 20 is the light fixture of any of embodiments 1 to 19, wherein the control mechanism includes a single circuit.

Embodiment 21 is the light fixture of any of embodiments 1 to 20, wherein the control mechanism provides a variable or pulsed voltage to the lighting element.

Embodiment 22 is the light fixture of any of embodiments 1 to 21, wherein the control mechanism comprises a dimmer switch.

Embodiment 23 is the light fixture of any of embodiments 1 to 22, wherein the lighting element comprises a light socket configured to be in electrical communication with a light bulb.

Embodiment 24 is the light fixture of any of embodiments 1 to 23, wherein the oriented crosslinked semi-crystalline polymer is selected from polyethylene, polyethylene-co-vinyl acetate, radiation-crosslinked polycyclooctene, polyurethane, polyamide, and polylactide.

Embodiment 25 is the light fixture of any of embodiments 1 to 24, wherein when the control mechanism changes the temperature of the oriented crosslinked semi-crystalline polymer, a shape of the oriented crosslinked semi-crystalline polymer changes.

Embodiment 26 is the light fixture of any of embodiments 1 to 25, wherein the oriented crosslinked semi-crystalline polymer is a two-way shape memory polymer.

Embodiment 27 is a method of making a light fixture including providing a lighting element, forming a crosslinked semi-crystalline polymer, and disposing the crosslinked semi-crystalline polymer adjacent to the lighting element or connecting the crosslinked semi-crystalline polymer to the lighting element. The method further includes electrically connecting a control mechanism with the lighting element. The control mechanism controls an energy output of the lighting element and a temperature of the crosslinked semi-crystalline polymer.

Embodiment 28 is the method of embodiment 27, wherein the forming a crosslinked semi-crystalline polymer further comprises orienting the crosslinked semi-crystalline polymer to a length at least 25% greater than the length of the crosslinked semi-crystalline polymer prior to the orienting.

Embodiment 29 is the method of embodiment 27 or embodiment 28, wherein forming a crosslinked semi-crystalline polymer further comprises orienting the crosslinked semi-crystalline polymer to a length at least 50% greater than the length of the crosslinked semi-crystalline polymer prior to the orienting.

Embodiment 30 is the method of any of embodiments 27 to 29, wherein forming a crosslinked semi-crystalline polymer further comprises orienting the crosslinked semi-crystalline polymer to a length at least 100% greater than the length of the crosslinked semi-crystalline polymer prior to the orienting.

Embodiment 31 is the method of any of embodiments 27 to 30, wherein forming an oriented crosslinked semi-crystalline polymer further comprises laminating the oriented crosslinked semi-crystalline polymer to a resilient material to form a crosslinked semi-crystalline laminate, wherein the resilient material comprises a coefficient of expansion of less than $50 \times 10^{-6}$ per degree Celsius.

Embodiment 32 is the method of any of embodiments 27 to 31, wherein forming an oriented crosslinked semi-crystalline polymer comprises radiation crosslinking the crosslinked semi-crystalline polymer prior to the orienting.

Embodiment 33 is the method of any of embodiments 27 to 32, wherein the light fixture further comprises a heating element in electrical communication with the control mechanism.

Embodiment 34 is the method of any of embodiments 27 to 33, wherein the control mechanism controls a temperature of the oriented crosslinked semi-crystalline polymer by controlling an amount of heat applied to the oriented crosslinked semi-crystalline polymer from the energy output of the lighting element, from the heating element, or a combination thereof.

Embodiment 35 is the method of embodiment 34, wherein the control mechanism controls a temperature of the oriented crosslinked semi-crystalline polymer by controlling an amount of heat applied to the oriented crosslinked semi-crystalline polymer from the heating element.

Embodiment 36 is the method of embodiment 34, wherein the control mechanism controls a temperature of the oriented crosslinked semi-crystalline polymer by controlling an amount of heat applied to the oriented crosslinked semi-crystalline polymer from an energy output of the lighting element.

Embodiment 37 is the method of any of embodiments 27 to 36, wherein the lighting element is attached to the oriented crosslinked semi-crystalline polymer and a weight of the lighting element is supported by the oriented crosslinked semi-crystalline polymer.

Embodiment 38 is the method of any of embodiments 27 to 37, wherein the oriented crosslinked semi-crystalline polymer comprises an aspect ratio of length to width of at least 4.

Embodiment 39 is the method of any of embodiments 27 to 35, 37, or 38, wherein the light fixture is a pendant light fixture comprising the lighting element suspended from the oriented crosslinked semi-crystalline polymer.

Embodiment 40 is the method of any of embodiments 27 to 34, 36, or 38, wherein the oriented crosslinked semi-crystalline polymer is laminated to a resilient material to form a crosslinked semi-crystalline laminate, wherein the resilient material comprises a coefficient of expansion of less than $50 \times 10^{-6}$ per degree Celsius.

Embodiment 41 is the method of embodiment 40, wherein the crosslinked semi-crystalline laminate forms a shade at least partially surrounding the lighting element.

Embodiment 42 is the method of embodiment 40 or embodiment 41, wherein the laminate affects a position of light emitted from the lighting element with a change in the temperature of the oriented crosslinked semi-crystalline polymer.

Embodiment 43 is the method of embodiment 40 or embodiment 41, wherein the laminate affects a direction of light emitted from the lighting element with a change in the temperature of the oriented crosslinked semi-crystalline polymer.

Embodiment 44 is the method of any of embodiments 40 to 43, wherein the resilient material is a metal, a fiber-reinforced polymeric composite, a filled polymeric composite, or a glass.

Embodiment 45 is the method of any of embodiments 40 to 44, wherein the crosslinked semi-crystalline laminate comprises an adhesive disposed between the oriented crosslinked semi-crystalline polymer and the resilient material.

Embodiment 46 is the method of embodiment 45, wherein the adhesive comprises a foam adhesive.

Embodiment 47 is the method of embodiment 45 or embodiment 46, wherein the adhesive comprises a thickness of at least 0.4 millimeters.

Embodiment 48 is the method of any of embodiments 40 to 47, wherein the oriented crosslinked semi-crystalline polymer comprises a plurality of segments, a pattern, a complex shape, or a combination thereof.

Embodiment 49 is the method of embodiment 48, wherein the oriented crosslinked semi-crystalline polymer comprises a plurality of segments cooperating together to form a shade at least partially surrounding the lighting element.

Embodiment 50 is the method of embodiment 49, wherein each segment of the oriented crosslinked semi-crystalline polymer comprises a petal shape.

Embodiment 51 is the method of any of embodiments 27 to 50, wherein the control mechanism includes a single circuit.

Embodiment 52 is the method of any of embodiments 27 to 51, wherein the control mechanism provides a variable or pulsed voltage to the lighting element.

Embodiment 53 is the method of any of embodiments 27 to 52, wherein the control mechanism comprises a dimmer switch.

Embodiment 54 is the method of any of embodiments 27 to 53, wherein the lighting element comprises a light socket configured to be in electrical communication with a light bulb.

Embodiment 55 is the method of any of embodiments 27 to 54, wherein the oriented crosslinked semi-crystalline polymer is a crosslinked semi-crystalline polymer.

Embodiment 56 is the method of any of embodiments 27 to 55, wherein the oriented crosslinked semi-crystalline polymer is selected from polyethylene, polyethylene-co-vinyl acetate, radiation-crosslinked polycyclooctene, polyurethane, polyamide, and polylactide.

Embodiment 57 is the method of any of embodiments 27 to 56, wherein when the control mechanism changes the temperature of the oriented crosslinked semi-crystalline polymer, a shape of the oriented crosslinked semi-crystalline polymer changes.

Embodiment 58 is the method of any of embodiments 27 to 57, wherein the oriented crosslinked semi-crystalline polymer is a two-way shape memory polymer.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

Poly(ethylene-co-vinyl acetate) (Elvax 460) was obtained from DuPont (Wilmington, Del.). Poly(cyclooctene) (Vestenamer 8012) was obtained from Struktol Company of America (Stow, Ohio). Low density polyethylene (LDPE) was obtained from Plastics International (Eden Prairie, Minn.).

Preparative Example 1

Radiation Crosslinked Elvax 460

The as-received Elvax 460 resin was melt pressed in a Carver press (Carver, Inc., Wabash, Ind.) at 120° C. for 10 min with a 40 mil shim spacer. The pEVA film was then e-beam cured at 220 kV and 6 MRad per pass for 6 passes on each side of the film.

Preparative Example 2

Radiation Crosslinked LDPE

The as-received LDPE was melt pressed in a Carver press at 120° C. for 10 min into a 0.3 mm film. The LDPE film was then e-beam cured at 220 kV and 12 MRad per pass for 3 passes on each side of the film.

Preparative Example 3

Radiation Crosslinked Vestenamer 8012

The as-received Vestenamer 8012 resin was melt pressed in a Carver press at 100° C. for 10 min into a 0.3 mm film. The Vestenamer 8012 film was then e-beam cured at 220 kV and 6 MRad per pass for 6 passes on each side of the film.

Test Methods:

DSC:

DSC experiments were performed on a TA Q2000 instrument (TA Instruments, New Castle, Del.) at a heating rate of 10° C./min and a cooling rate of 20° C./min. The melting temperatures ($T_m$) for the polymer resins were taken from the melting endothermic peak in the second heat. The $T_m$ measured for Preparative Example 1 was 85° C.

Tensile Test:

The stress-strain curves for the cross-linked semi-crystalline polymers were obtained using an Instron Tensile Tester (Instron, Norwood, Mass.). Sample specimens of 12.7 mm width and 0.28 mm thickness were loaded onto the instrument in an environment chamber at $T_m+25°$ C. with a grip separation of 50.8 mm. The sample specimens were allowed to equilibrate in the sample chamber for 5 min prior to loading at a 50.8 mm/min rate. The moduli of the samples were recorded from the slope of the line that passes through the data points at strain values of 99% and 101%. For Preparative Example 1, the modulus was 0.22 MPa at 120° C.

Reversible Shape-Change Characterization:

Reversible shape changes in the cross-linked semi-crystalline polymers were evaluated using a DMA Q800 instrument (TA Instruments, New Castle, Del.) under the "controlled force" mode. Test specimens were strips of material nominally 0.30 mm thick and 6 mm wide. The specimens were first heated to 100° C., and they were then subjected to a static force in the range of 0 N and 4 N to produce a strain in the range of 0% and 150%. The samples were allowed to equilibrate under this static force for 10 min, after which the temperature was ramped between 100° C. and 0° C. at 10° C./min. The upper and lower strain limits for a given sample under a given static force are recorded. The results are shown in Table 1. These results show that each of the Preparative examples displays two-way memory behavior and is suitable for a responsive lighting article.

Figure 8:
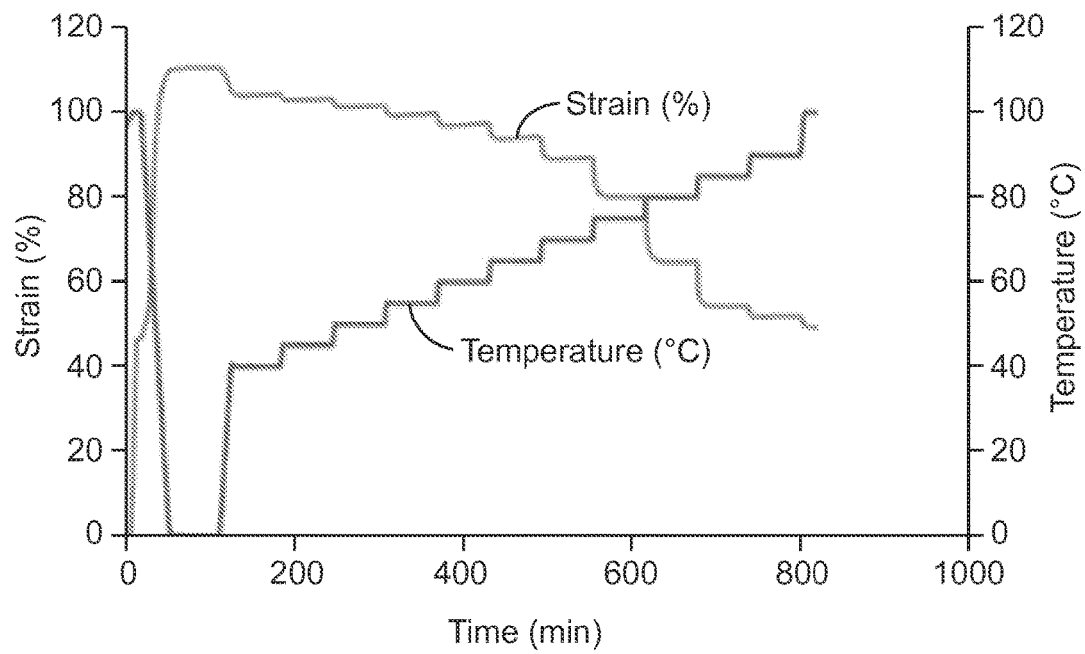
FIG. 8 is a graph of strain percent and temperature versus time for a poly(ethylene-co-vinyl acetate film under a constant force.

Construction of Example 1:

A 12 inch long strip (2 mm wide, 0.4 mm thick) of the material from Preparative Example 1 was cut to match the mass of the pendant lighting element (50 g, comprising a light bulb in a simple socket). These dimensions were chosen such that G/AE=278%. The heating chamber comprises a 12 inch downrod (Hunter 26019 from Amazon.com) and a heating tape (BIH051020L, 105 watts at 120 V, from Amazon.com). The heating tape was wrapped around the downrod evenly and connected parallel to the lighting element. The heating chamber was observed to reach 100° C. at full power. The lighting element was attached to the lower end of the oriented crosslinked semi-crystalline polymer strip, and the oriented crosslinked semi-crystalline polymer strip was placed in the center of the heating chamber. Both the heating tape and the light element were controlled through a single dimmer switch connected to a 120 V alternating current. Upon first turning on the lighting element at full power, the oriented crosslinked semi-crystalline polymer strip was heated, and it subsequently reached its new length, $l_0'$, which is 40% longer than the initial length $l_0$. Turning off the lighting fixture resulted in the cooling of the heating chamber back to room temperature, and the crosslinked semi-crystalline polymer strip reached its full length, $l'$, which is 110% longer than $l_0$. Adjusting the dimmer switch resulted in different temperature in the heating chamber, which varied the length of the crosslinked semi-crystalline polymer between $l_0'$ and $l'$. Simultaneously, the light output of the lighting element was adjusted between full brightness and off. FIG. 8 shows the strain of the oriented crosslinked semi-crystalline polymer under a constant biased force.

Referring to FIG. 4A, a side view schematic of the light fixture of Example 1 is shown, in which the control mechanism is turned off. The light fixture 400 comprises a lighting element 40, an oriented crosslinked semi-crystalline polymer 42 connected to the lighting element 40, and a control mechanism 44. The control mechanism 44 is in electrical communication with the lighting element 40 and controls an energy output of the lighting element 40 and a temperature of the oriented crosslinked semi-crystalline polymer 42. The lighting element 40 comprises a light socket with a light bulb 41 disposed within (e.g., in electrical communication with) the light socket. The lighting element 40 is attached to the oriented crosslinked semi-crystalline polymer 42 and a weight of the lighting element 40 is supported by the oriented crosslinked semi-crystalline polymer 42. The light fixture 400 further comprises a heating element 46 in electrical communication with the control mechanism 44. The control mechanism 44 controls a temperature of the oriented crosslinked semi-crystalline polymer 42 by controlling an amount of heat applied to the oriented crosslinked semi-crystalline polymer 42 from the energy output of the lighting element 40 and/or from the heating element 46. The heating element 46 is wound around a heating chamber (not shown) which contains a portion of the length of the oriented crosslinked semi-crystalline polymer 42, FIG. 4B is a side view schematic of the light fixture of FIG. 4A, in which the control mechanism 44 was turned on to a first intensity level. FIG. 4C is a side view schematic of the light fixture of FIG. 4B, in which the control mechanism 44 was turned on to a second intensity level higher than the first intensity level and the temperature of the oriented crosslinked semi-crystalline polymer 42 increased as compared to when the control mechanism 44 was turned off. Accordingly, the length of the oriented crosslinked semi-crystalline polymer 44 decreased, resulting in the bulb 41 being moved upwards as compared to its position when the control mechanism 44 was turned off. FIG. 4D is a side view schematic of the light fixture of FIG. 4C, after the temperature of the oriented crosslinked semi-crystalline polymer 42 was increased as compared to the light fixture of FIG. 4C. Similar to FIG. 4C, the length of the oriented crosslinked semi-crystalline polymer 44 in FIG. 4D decreased further, resulting in the bulb 41 being moved upwards as compared to its position in FIG. 4C.

FIG. 4E is a side view schematic of the light fixture of 4D, in which the control mechanism 44 was subsequently turned off. FIG. 4F is a side view schematic of the light fixture of 4E, in which the control mechanism 44 had already been turned off and after the temperature of the oriented crosslinked semi-crystalline polymer 42 had decreased as compared to the light fixture of FIG. 4E. Accordingly, the length of the oriented crosslinked semi-crystalline polymer 42 increased, resulting in the bulb 41 being moved downwards as compared to its position when the control mechanism 44 immediately after having been turned off. FIG. 4G is a side view schematic of the light fixture of 4F, after the temperature of the oriented crosslinked semi-crystalline polymer 42 decreased as compared to the light fixture of FIG. 4F, and the length of the oriented crosslinked semi-crystalline polymer 42 increased. The length of the oriented crosslinked semi-crystalline polymer 42 increased to approximately the same length as the oriented crosslinked semi-crystalline polymer 42 of FIG. 4A, prior to initially turning on the control mechanism 44.

TABLE 1

| Example | Static Force (N) | Upper Temp. (° C.) | Upper strain limit (%) | Lower strain limit (%) |
|---|---|---|---|---|
| Preparative Example 1 | 1.25 | 100 | 110.1 | 49.1 |
| Preparative Example 2 | 0.8 | 100 | 96.8 | 72.6 |
| Preparative Example 3 | 0.4 | 100 | 8.7 | 7.0 |
|  | 0.6 |  | 15.7 | 10.7 |
|  | 0.8 |  | 26.4 | 14.7 |
|  | 1.0 |  | 40.3 | 19.2 |

Construction of Example 2

Polycyclooctene (Vestenamer 8012) was extruded at 250° F. into a film 0.33 mm thick and 10 cm wide. The film was then exposed to 9 MRad of E-Beam radiation at 300 KeV. A piece of this film 10 cm×18 cm was wiped with acetone. Ink marks were placed on the film at 1.25 cm intervals. The film was heated with a heat gun until it became transparent and it was then stretched until the spacing between the ink marks was 2.5 cm. The film was then treated with a hand-held corona generator (BD-20AC from Electro-Technic Products, Inc., Chicago, Ill.) for 2 minutes. A thin coating of Tape Primer 94 (from 3M, St. Paul, Minn.) was applied using a paper towel moistened with the primer solution. A sheet of stainless steel shim material (Precision Brand 22L3 or Grainger 3L605, 15 cm×25 cm×0.08 mm) was rinsed with toluene and then wiped with a paper towel moistened with 3M Adhesion Promoter 111 (3M). A piece of VHB Tape 5930 (3M) was then adhered to cover the entire primed stainless steel surface. The opposite stainless steel surface was wrapped around a cylinder with a diameter of 23 cm, and the primed polycylooctene film was then laminated to the exposed VHB tape surface while in the curved state. The resulting laminate was cut into strips that were each 8.8 cm long with a 1.9 cm square base on one end and a semicircle with a radius of 1.1 cm on the other end. These were then heated with a heat gun to a temperature above 60° C., and the strips then spontaneously curved inward toward the polymer face. An aluminum sheet (15 cm×3.75 cm×0.16 cm) was bent into a crescent shape with an inside diameter of 5.4 cm. A strip of VHB tape 5925 (6 cm×1.2 cm) was attached to one edge of the aluminum sheet. The square end of each of eight laminate strips then adhered to the other surface of the VHB tape 5925. The aluminum strip was then fixed around a light fixture with a 60 W ceiling fan bulb (14029 from General Electric Company, East Cleveland, Ohio) such that the strips surrounded the bulb. The bulb was then connected to a dimmer switch for 120 V AC current. When the dimmer switch was set to different power intensities, the curvature of the strips also changed. In general, at low power intensities with a dim light, the strips would adopt less curvature than the state when the light was off. At high power intensities with a bright light, the strips would separate from each other at their bases. The overall effect was that the strips formed a shade around the bulb, and the diameter of the opening of that shade increased with high intensity light and decreased with low intensity light.

Figure 5A:
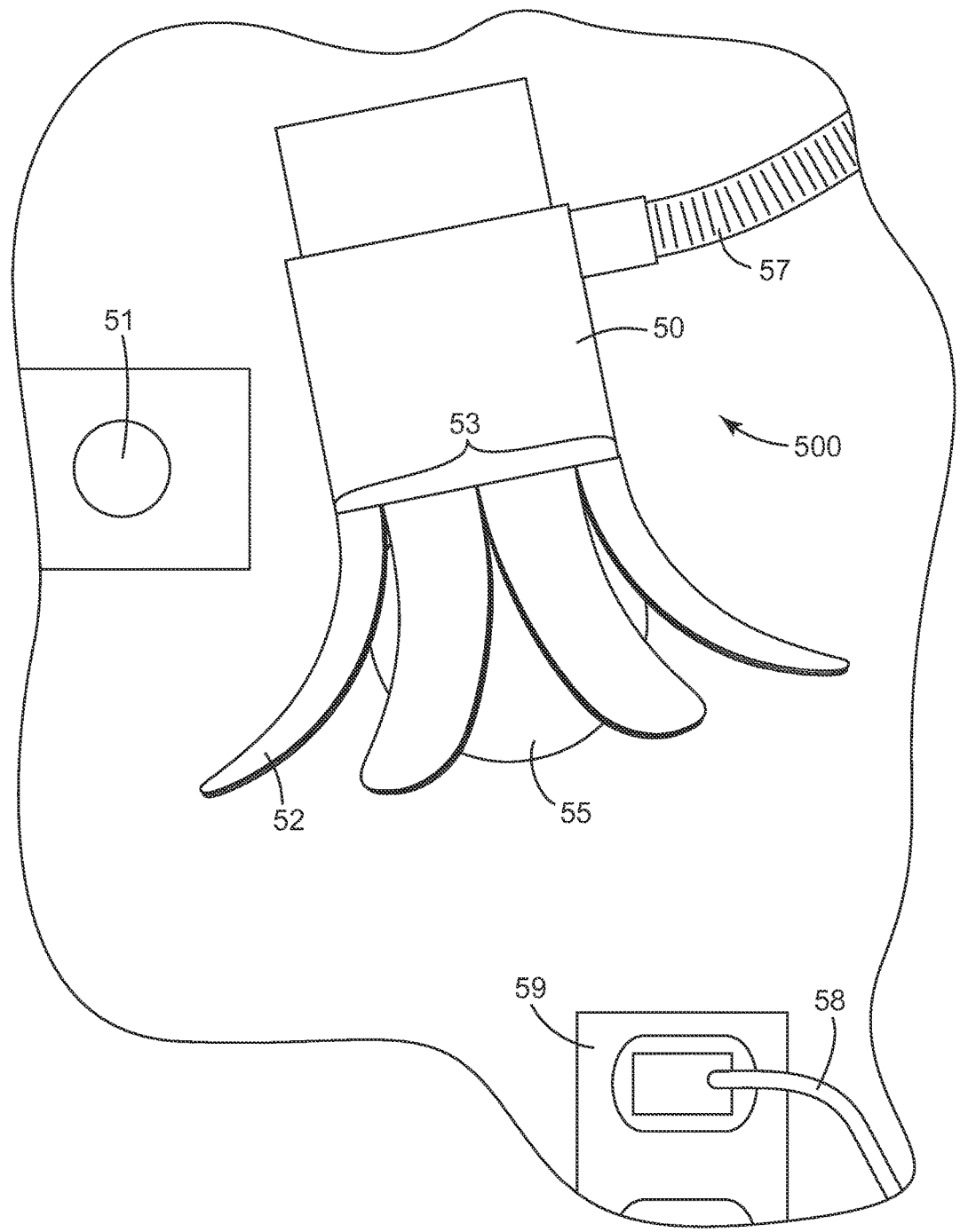
FIG. 5A is a side view schematic of an exemplary light fixture comprising a shade, in which the control mechanism is turned off.
Figure 5B:
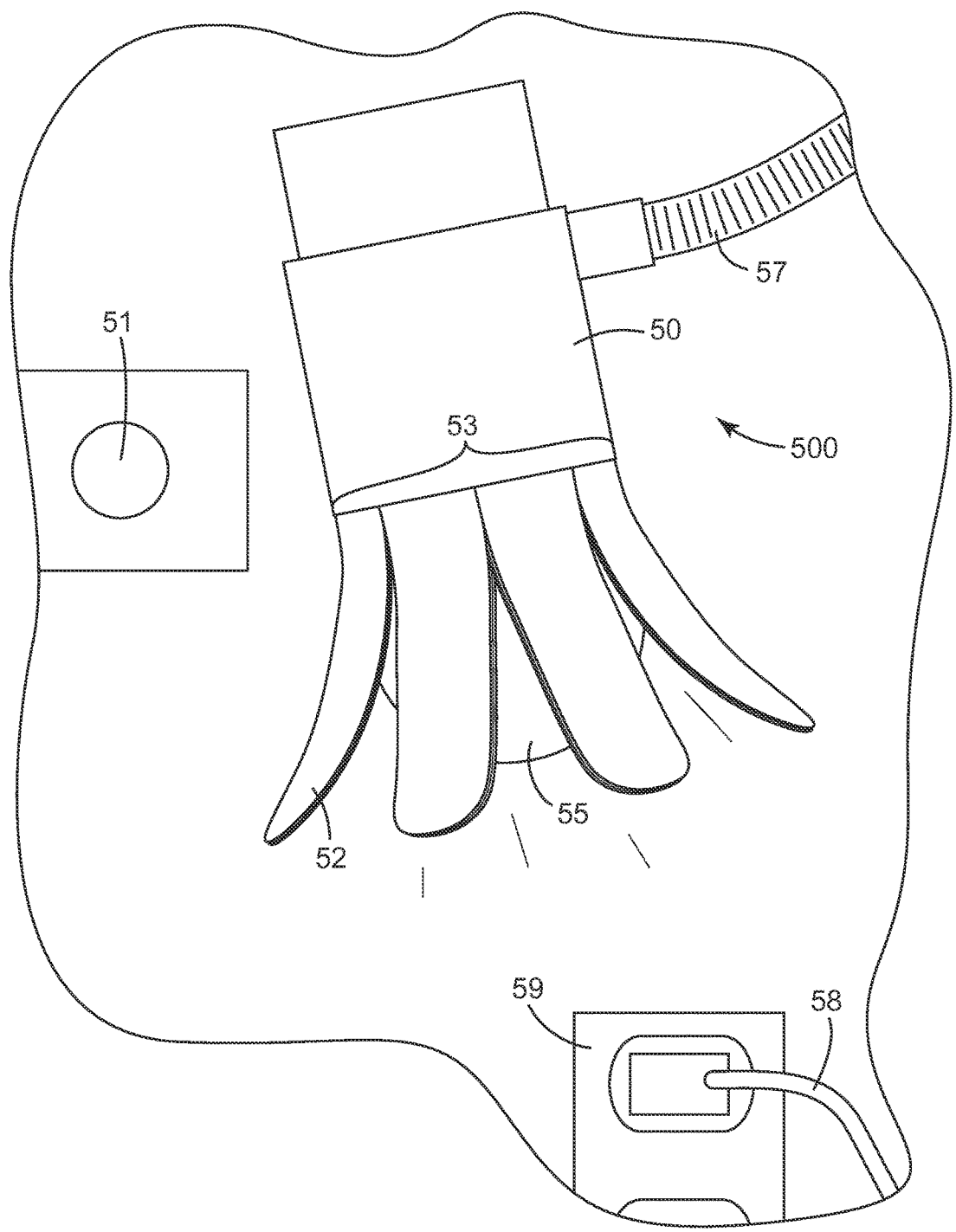
FIG. 5B is a side view schematic of the light fixture of FIG. 5A, in which the control mechanism is turned on to a first intensity level and the temperature of the oriented crosslinked semi-crystalline polymer has increased as compared to when the control mechanism was turned off.
Figure 5C:
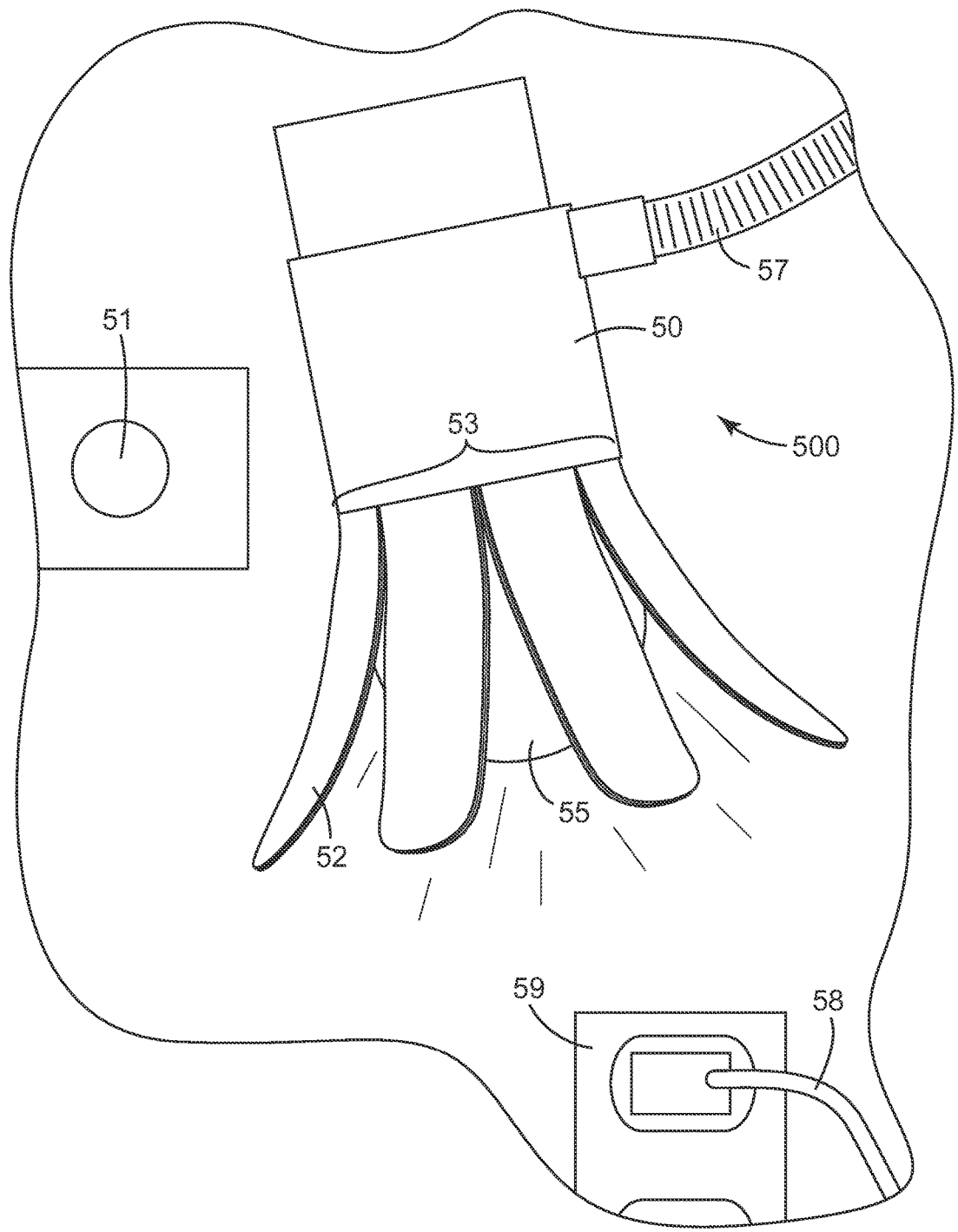
FIG. 5C is a side view schematic of the light fixture of FIG. 5B, in which the control mechanism is turned on to a second intensity level higher than the first intensity level and the temperature of the oriented crosslinked semi-crystalline polymer has increased as compared to the light fixture of Figure of 5B.

Referring to FIG. 5A, a side view schematic is provided of the light fixture of Example 2, in which the control mechanism is turned off. The light fixture 500 comprises a lighting element 50, an oriented crosslinked semi-crystalline polymer 52 connected to the lighting element 50, and a control mechanism 51. The control mechanism 51 is in electrical communication with the lighting element 50 and controls an energy output of the lighting element 50 and a temperature of the oriented crosslinked semi-crystalline polymer 52. The lighting element 50 of this embodiment comprises a light socket (not shown). The light socket is at least partially surrounded by a shade 53, and a light bulb 55 is disposed within the light socket. The light fixture 500 further comprises a flexible neck 57 and a power cord 58. The power cord 58 is shown plugged into an electrical outlet 59, which is in electrical communication with the control mechanism 51. FIG. 5B is a side view schematic of the light fixture of FIG. 5A, in which the control mechanism 51 was turned on to a first intensity level and the temperature of the oriented crosslinked semi-crystalline polymer 52 increased as compared to when the control mechanism 51 had been turned off (in FIG. 5A). FIG. 5C is a side view schematic of the light fixture of FIG. 5B, in which the control mechanism 51 was turned on to a second intensity level higher than the first intensity level and the temperature of the oriented crosslinked semi-crystalline polymer 52 increased as compared to the light fixture of Figure of 5B. The diameter of the shade 53 (e.g., at the tips of the petals) is shown to have expanded between FIG. 5B and FIG. 5C.

Figure 9:
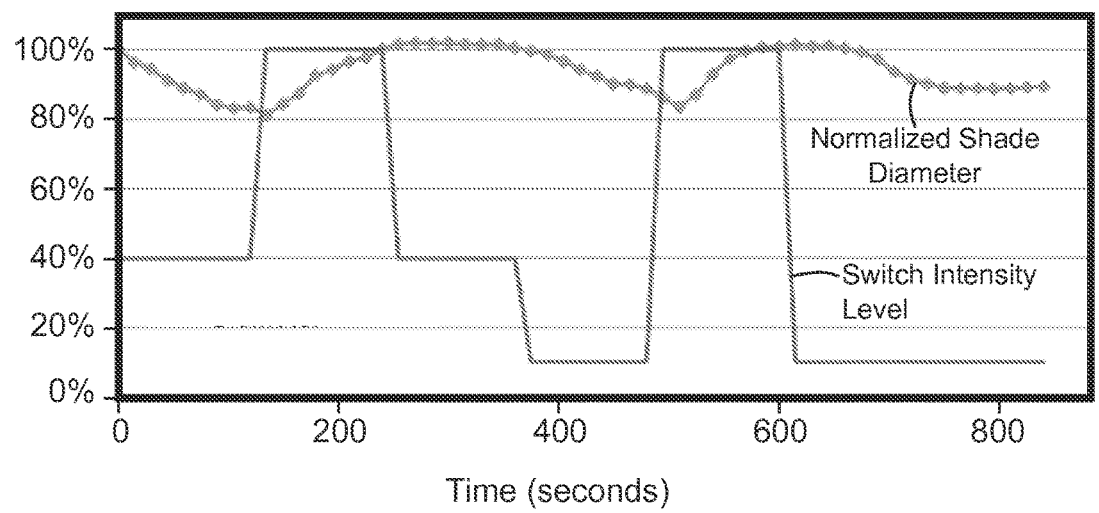
FIG. 9 is a graph of normalized shade diameter and switch intensity level versus time for the laminate of Example 2.

The power intensity was varied with the dimmer switch, and the maximum light-shade diameter was measured as a function of time. The resulting light-shade diameter, power intensity, and time profile are shown in FIG. 9.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A light fixture comprising:
   a) a lighting element;
   b) an oriented crosslinked semi-crystalline polymer disposed adjacent to or connected to the lighting element; and
   c) a control mechanism in electrical communication with the lighting element, the control mechanism controlling an energy output of the lighting element and a temperature of the oriented crosslinked semi-crystalline polymer.

2. The light fixture of claim 1, further comprising a heating element in electrical communication with the control mechanism.

3. The light fixture of claim 1, wherein the control mechanism controls a temperature of the oriented crosslinked semi-crystalline polymer by controlling an amount of heat applied to the oriented crosslinked semi-crystalline polymer from the energy output of the lighting element, from the heating element, or a combination thereof.

4. The light fixture of claim 1, wherein the lighting element is attached to the oriented crosslinked semi-crystalline polymer and a weight of the lighting element is supported by the oriented crosslinked semi-crystalline polymer.

5. The light fixture of claim 1, wherein the oriented crosslinked semi-crystalline polymer is laminated to a resilient material to form a crosslinked semi-crystalline laminate, wherein the resilient material comprises a coefficient of expansion of less than $50 \times 10^{-6}$ per degree Celsius.

6. The light fixture of claim 5, wherein the crosslinked semi-crystalline laminate forms a shade at least partially surrounding the lighting element.

7. The light fixture of claim 1, wherein the oriented crosslinked semi-crystalline polymer affects a position of the lighting element with a change in the temperature of the oriented crosslinked semi-crystalline polymer.

8. The light fixture of claim 5, wherein the laminate affects a direction of light emitted from the lighting element with a change in the temperature of the oriented crosslinked semi-crystalline polymer.

9. The light fixture of claim 1, wherein the control mechanism includes a single circuit.

10. The light fixture of claim 1, wherein the control mechanism comprises a dimmer switch.

11. The light fixture of claim 1, wherein the oriented crosslinked semi-crystalline polymer is selected from polyethylene, polyethylene-co-vinyl acetate, radiation-crosslinked polycyclooctene, polyurethane, polyamide, and polylactide.

12. The light fixture of claim 1, wherein the oriented crosslinked semi-crystalline polymer is a two-way shape memory polymer.

13. A method of making a light fixture comprising:
  a) providing a lighting element;
  b) forming a crosslinked semi-crystalline polymer;
  c) disposing the crosslinked semi-crystalline polymer adjacent to the lighting element or connecting the crosslinked semi-crystalline polymer to the lighting element; and
  c) electrically connecting a control mechanism with the lighting element, the control mechanism controlling an energy output of the lighting element and a temperature of the crosslinked semi-crystalline polymer.

14. The method of claim 13, wherein the forming a crosslinked semi-crystalline polymer further comprises orienting the crosslinked semi-crystalline polymer to a length at least 50% greater than the length of the crosslinked semi-crystalline polymer prior to the orienting.

15. The method of claim 13, wherein forming an oriented crosslinked semi-crystalline polymer further comprises laminating the oriented crosslinked semi-crystalline polymer to a resilient material to form a crosslinked semi-crystalline laminate, wherein the resilient material comprises a coefficient of expansion of less than $50 \times 10^{-6}$ per degree Celsius.

16. The light fixture of claim 1, wherein the oriented crosslinked semi-crystalline polymer is selected from polyethylene-co-vinyl acetate, radiation-crosslinked polycyclooctene, and polylactide.

17. The light fixture of claim 4, wherein the light fixture is a pendant light fixture comprising the lighting element suspended from the oriented crosslinked semi-crystalline polymer.

* * * * *